US011454338B2

(12) United States Patent
DeBerry

(10) Patent No.: US 11,454,338 B2
(45) Date of Patent: Sep. 27, 2022

(54) ANTI-ROTATION DEVICE FOR CONNECTOR ASSEMBLY

(71) Applicant: Dril-Quip, Inc., Houston, TX (US)

(72) Inventor: Blake T. DeBerry, Houston, TX (US)

(73) Assignee: Dril-Quip, Inc., Houston, TX (US)

( * ) Notice: Subject to any disclaimer, the term of this patent is extended or adjusted under 35 U.S.C. 154(b) by 0 days.

(21) Appl. No.: 16/460,352

(22) Filed: Jul. 2, 2019

(65) Prior Publication Data

US 2019/0323638 A1 Oct. 24, 2019

Related U.S. Application Data

(62) Division of application No. 15/169,220, filed on May 31, 2016, now Pat. No. 10,385,994.

(Continued)

(51) Int. Cl.

*F16L 15/08* (2006.01)
*E21B 17/043* (2006.01)
*E21B 17/046* (2006.01)

(52) U.S. Cl.

CPC ............ *F16L 15/08* (2013.01); *E21B 17/043* (2013.01); *E21B 17/046* (2013.01); *E21B 17/0465* (2020.05)

(58) Field of Classification Search

CPC ........ F16L 15/08; E21B 17/02; E21B 17/043; E21B 17/046; E21B 17/0465; E21B 19/16

See application file for complete search history.

(56) References Cited

U.S. PATENT DOCUMENTS

| | | | |
|---|---|---|---|
| 18,112 | A | 9/1857 | Trowbridge |
| 407,028 | A | 7/1889 | McLane |

(Continued)

FOREIGN PATENT DOCUMENTS

| | | | |
|---|---|---|---|
| CN | 202273603 | U | 6/2012 |
| EP | 0867597 | A2 | 9/1998 |

(Continued)

OTHER PUBLICATIONS

Search Report issued in related United Kingdom Application No. 1609595.2, dated Oct. 27, 2016 (9 pages).

(Continued)

*Primary Examiner* — David P Bryant
*Assistant Examiner* — Christine Bersabal
(74) *Attorney, Agent, or Firm* — Baker Botts L.L.P.

(57) ABSTRACT

An improved anti-rotation device and connector assembly designed to prevent rotation of a first threaded portion of the connector assembly with respect to a second threaded portion of the connector assembly is provided. The anti-rotation device and connector assembly include features that guide and smooth the transition of the anti-rotation device into a position extending through the first and second threaded portions. The anti-rotation device may extend through a tab/groove interface between the first and second threaded portions, or the anti-rotation device may engage opposing interfacing edges of the first and second threaded portions along the length of the anti-rotation device. Once the anti-rotation device is installed through the first and second threaded portions, the anti-rotation device may prevent rotation of the threaded portions relative to each other.

9 Claims, 7 Drawing Sheets

Related U.S. Application Data

(60) Provisional application No. 62/169,968, filed on Jun. 2, 2015.

(56) References Cited

U.S. PATENT DOCUMENTS

| | | | | |
|---|---|---|---|---|
| 499,312 | A | 6/1893 | Turner | |
| 804,185 | A | 11/1905 | Davison | |
| 1,681,699 | A | 8/1928 | Coates | |
| 3,948,545 | A | 4/1976 | Bonds | |
| 4,043,575 | A | 8/1977 | Roth | |
| 4,231,594 | A | 11/1980 | Merkle et al. | |
| 4,444,421 | A | 4/1984 | Ahlstone | |
| 5,275,246 | A | 1/1994 | Krasnov | |
| 7,146,704 | B2 * | 12/2006 | Otten | F16L 15/08 29/525.01 |
| 7,240,928 | B2 * | 7/2007 | Evans | E21B 17/0426 285/333 |
| 8,534,714 | B2 | 9/2013 | Buchanan | |
| 2003/0166418 | A1 | 9/2003 | Wentworth et al. | |
| 2004/0135370 | A1 | 7/2004 | Evans et al. | |
| 2013/0207382 | A1 | 8/2013 | Robichaux | |
| 2014/0167408 | A1 * | 6/2014 | Steen | E21B 17/043 285/330 |

FOREIGN PATENT DOCUMENTS

| | | | |
|---|---|---|---|
| EP | 1598583 | A1 | 11/2005 |
| GB | 207722 | A | 12/1923 |
| GB | 2356907 | A | 6/2001 |
| JP | 04296286 | A | 10/1992 |

OTHER PUBLICATIONS

Combined Search and Examination Report issued in related GB Patent Application No. GB2100138.3 dated Feb. 15, 2021, 2 pages.

* cited by examiner

ANTI-ROTATION DEVICE FOR CONNECTOR ASSEMBLY

CROSS REFERENCE TO RELATED APPLICATIONS

The present application is a divisional of U.S. application Ser. No. 15/169,220, entitled "Anti-Rotation Device for Connector Assembly", filed on May 31, 2016, which claims priority to U.S. provisional application Ser. No. 62/169,968, entitled "Anti-Rotation Device for Connector Assembly", filed on Jun. 2, 2015.

TECHNICAL FIELD

The present disclosure relates generally to connector assemblies for coupling strings of tubular and other components and, more particularly, to anti-rotation devices used to prevent rotation of threaded connector assemblies.

BACKGROUND

Offshore oil and gas drilling operations typically include the make-up of strings of pipe or casing members, frequently of relatively large diameter. The tubular strings may be driven into the ground underwater to be used for anchoring the drilling platform. Such strings are also used as conduits in the water through which a well may be initiated. The joint between members of such tubular strings must provide both structural strength and fluid pressure integrity. Such features of a joint might be provided, for example, by welding. However, because welding is a time-consuming operation, and drilling rig rates are high, particularly offshore, mechanical connectors are generally preferred. Typical mechanical connectors available include threaded type connectors in which tubular members are mutually rotated to thread a pin and box connector assembly, breach block connectors, and snap lock connectors.

In threaded mechanical connector assemblies an externally threaded end, known as the pin, mates with an internally threaded section, known as the box. The pin and the box on a threaded connector assembly are designed to be engaged with each other and rotated to a specific torque value for connecting the ends. After the connection is made, anti-rotation devices can be installed to secure the pin and the box together at the desired make-up torque. The anti-rotation devices are designed to ensure that the threaded portions of the connector assembly do not become tightened over the desired make-up torque or loosened from each other in response to forces applied to the pipe or casing members in the string.

Existing anti-rotation devices often feature a mechanical key that can be selectively positioned in a recess between the pin and the box of the connector assembly to prevent rotation of the pin and the box relative to each other in a certain direction once the make-up torque is reached. Unfortunately, these keys typically do not go into action to engage with the connector assembly until after the connection is loosened slightly. That is, the keys are generally first positioned in the recesses of the connector assembly, and then the pin and box are rotated slightly relative to each other to energize the key. As a result, the connection may be secured at a different torque than the initial desired make-up torque.

In addition, some existing anti-rotation keys are designed to interface very closely with the connector assembly to fill a recess therein. As such, these keys can be difficult to position in the corresponding recess and often must be hammered into engagement with the connector assembly using a large amount of force. This hammering process takes an undesirable amount of time and energy to ensure that the keys are lodged into their respective recesses in the connector assembly.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1A:
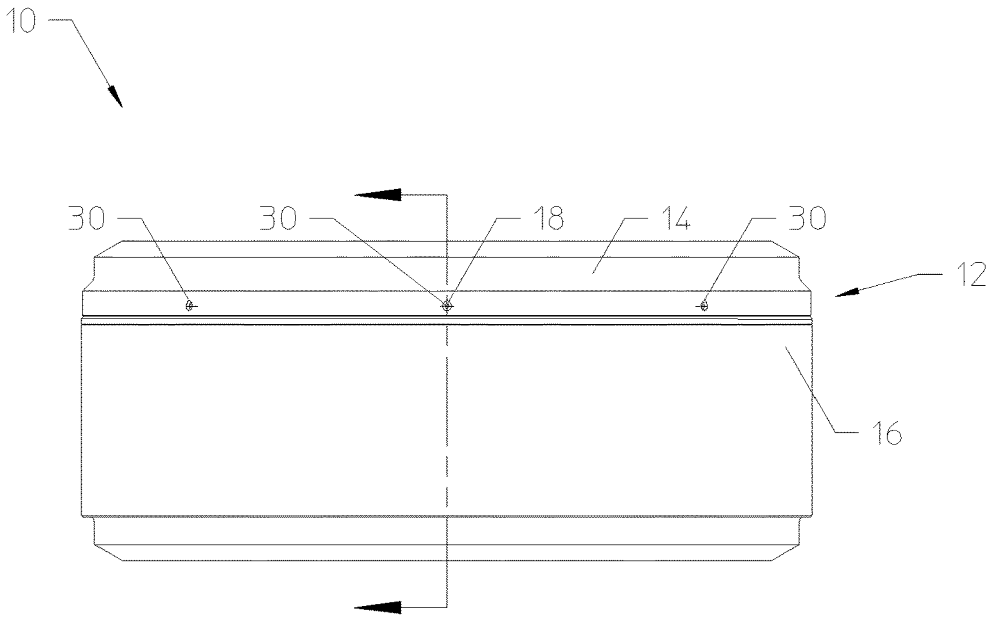
FIG. 1A is a front view of a connector assembly with an anti-rotation device, in accordance with an embodiment of the present disclosure.

Illustrative embodiments of the present disclosure are described in detail herein. In the interest of clarity, not all features of an actual implementation are described in this specification. It will of course be appreciated that in the development of any such actual embodiment, numerous implementation specific decisions must be made to achieve developers' specific goals, such as compliance with system related and business related constraints, which will vary from one implementation to another. Moreover, it will be appreciated that such a development effort might be complex and time consuming, but would nevertheless be a routine undertaking for those of ordinary skill in the art having the benefit of the present disclosure. Furthermore, in no way should the following examples be read to limit, or define, the scope of the disclosure.

Certain embodiments according to the present disclosure may be directed to an improved anti-rotation device and connector assembly designed to prevent rotation of a first threaded portion of the connector assembly with respect to a second threaded portion of the connector assembly. Existing systems utilize an anti-rotation key that must be hammered into a tight space and, therefore, takes an undesirable amount of time to secure within the connector assembly. In addition, some existing anti-rotation keys require a slight rotation of the threaded portions relative to each other to energize the key within a recess between the first and second threaded portions. The disclosed anti-rotation device and connector assembly include several features that facilitate easier, faster, and more accurate securing of the connector to prevent rotation of the threaded portions of the connector. For example, the connector assembly may include features that guide and smooth the transition of the anti-rotation device into a position extending through both the first and second threaded portions of the connection.

The presently disclosed anti-rotation device may include a pin, nail, spike, or other elongated feature designed to be driven through the first and second threaded portions of the connector assembly to secure the threaded portions relative to each other. The first threaded portion may include a pilot hole formed therethrough for directing the anti-rotation device into the connection. In some embodiments, the first threaded portion may include a groove formed therein, and the second threaded portion may include a tab to be received through the groove in the first threaded portion. The anti-rotation device may be designed to extend through the tab and the first threaded portion on one or both sides of the groove. In other embodiments, the pilot hole may be formed along an edge of the first threaded portion that interfaces with a mating edge of the second threaded portion, such that the anti-rotation device directly contacts both the first and second threaded portions along the entire length of the anti-rotation device upon its installation in the connection.

The disclosed anti-rotation device may be forced through the connection of the threaded portions using an installation tool such as, for example, a nail gun or other triggered mechanism. This may save time spent installing the anti-rotation device into the connector assembly, compared with existing systems that require a large amount of hammering to position a key in the connection. In some embodiments, the anti-rotation device may include a tapered pin designed to be forced through the connector assembly using a hammer. In such instances, the pilot hole may effectively guide the tapered pin, thereby decreasing the amount of time needed to install the anti-rotation device.

The disclosed installation method used for the anti-rotation device does not involve rotating the threaded portions of the connector relative to each other to energize a key, such as those used in existing systems. Instead, the installation method may enable the anti-rotation device to be positioned directly through the connector assembly with little or no clearance gap formed by rotating the threaded portions relative to each other. That is, the anti-rotation device is driven through the connector assembly in a way that reduces, minimizes, or eliminates any rotational clearance gap from the proper make-up torque for the connection.

Figure 1B:
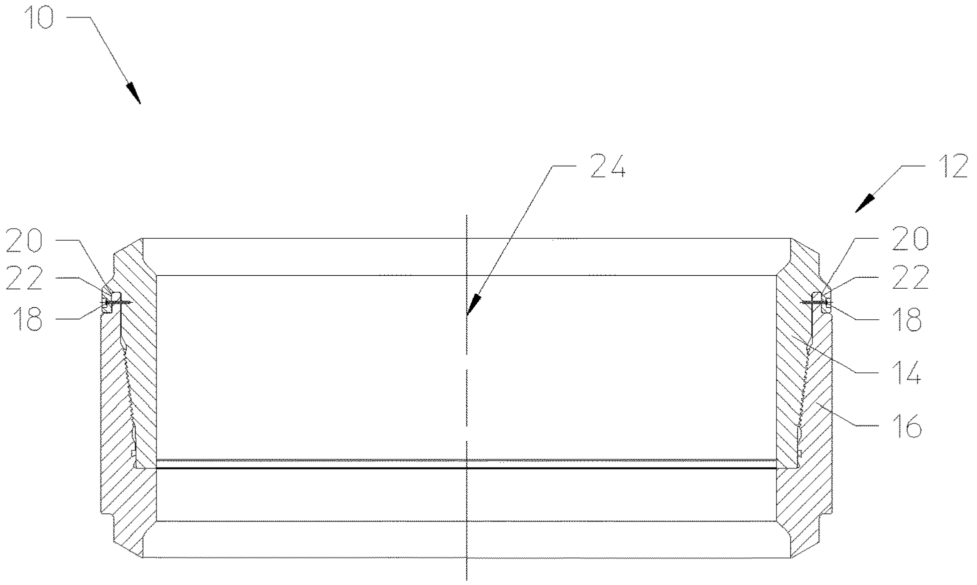
FIG. 1B is a cutaway view of the connector assembly of FIG. 1A, in accordance with an embodiment of the present disclosure.

Turning now to the drawings, FIGS. 1A and 1B illustrate a system 10 that includes a connector assembly 12 with a first threaded portion 14 and a second threaded portion 16 that may be secured in a desired rotational position relative to each other by an improved anti-rotation device 18. The first threaded portion 14 of the connector assembly 12 may be an externally threaded end, known as the “pin”, while the second threaded portion 16 is an internally threaded section, known as the “box”. The pin and box are designed to be threaded together to connect a first tubular component (not shown) to a second tubular component (not shown). These tubular components may include, for example, lengths of a wire stem or large diameter casing.

In some embodiments, the pin is formed into the first tubular component and the box is formed into the second tubular component, such that the connector assembly 12 is integral to the tubular components being connected. In other embodiments, the pin and the box may be separate components that are attached to their respective tubular components as desired to facilitate the connection. However, the present disclosure is not limited to any specific configuration of the pin and box relative to the tubular components being connected.

When forming these tubular connections using the connector assembly 12, it is desirable to rotate the first and second threaded portions 14 and 16 relative to each other until the connector assembly 12 reaches a desired make-up torque. Upon reaching this make-up torque, the connection may be secured using one or more anti-rotation devices 18 to prevent the threaded portions 14 and 16 from being rotated away from their designated make-up torque. As illustrated in FIGS. 1A and 1B, it may be desirable to arrange several of these anti-rotation devices 18 about a circumference of the connector assembly 12, to ensure a secure connection around the entire boundary between the first and second threaded portions 14 and 16.

FIG. 1B provides a more detailed view of the anti-rotation devices 18 interacting with the connector assembly 12 to secure the first threaded portion 14 relative to the second threaded portion 16. In some embodiments, the first threaded portion 14 may include a groove 20 formed therein, while the second threaded portion 16 may include a tab 22 configured to be disposed through the groove 20 of the first threaded portion 14. Once installed, the anti-rotation device 18 may extend through the tab 22 and through the first threaded portion 14, in order to secure the portions of the connector assembly 12 in a desired rotational position. Once the anti-rotation device 18 is installed through the tab 22 and the first threaded portion 14, the anti-rotation device 18 may prevent rotation of the threaded portions 14 and 16 relative to each other.

As illustrated, the tab 22 and the groove 20 may be oriented so that the tab 22 extends through the groove 20 in a direction substantially parallel to a longitudinal axis 24 of the connector assembly 12. The anti-rotation device 18 may extend through the tab 22 and the first threaded portion 14 in a radially inward direction with respect to the axis 24 of the connector assembly 12. It should be noted that other arrangements and angles of these components relative to each other may be utilized in other embodiments of the disclosed system 10.

The illustrated tab 22 may be a cylindrical tab extending from the second threaded portion 16 all the way around the circumference of the connection. The groove 20 in the first threaded portion 14 is designed to overlap the tab 22 extending therethrough. As described in detail below, the first threaded portion 14 may include a pilot hole formed therein to guide the anti-rotation device 18 through the first threaded portion 14 and into the tab 22 extending through the groove 20. The pilot hole may extend through the first threaded portion 14 on one or both sides of the groove 20. The anti-rotation device 18 may be forced through the first threaded portion 14 and the tab 22, guided by the pilot hole, to form a zero-tolerance rotational connection between the first and second threaded portions 14 and 16. That is, once the anti-rotation device 18 is installed through both portions, the first and second threaded portions 14 and 16 cannot rotate relative to each other.

The anti-rotation device 18 may include any elongated structural mechanism that can be forced through the first and second threaded portions at their interface. For example, the anti-rotation device 18 may include a hardened nail, a pin (tapered or having a constant thickness), or a spike. The anti-rotation device 18 may be delivered into the connector assembly 12 via an installation tool or similar trigger mechanism. It may be desirable for the tab 22 to be at least as thick as the diameter of the anti-rotation device 18 being forced through the tab 22. Once installed, the anti-rotation device 18 may secure the threaded portions 14 and 16 relative to each other in a way that prevents rotation of these parts in either direction, instead of being limited to stopping only right-hand or left-hand rotations.

Once the anti-rotation device 18 is installed through the tab 22 and the first threaded portion 14, the anti-rotation device 18 may provide a double shear connection to prevent the connector assembly 12 from unlocking. That is, since the anti-rotation device 18 is forced through the tab/groove connection of the first and second threaded portions 14 and 16, the anti-rotation device 18 would have to be sheared in two places (both sides of the tab 22) to allow the connection to rotate. Thus, the anti-rotation device 18 provides a secure connection between the first and second threaded portions 14 and 16 due to the connection interface between the threaded portions. This may provide a stronger connection than what is currently offered through existing anti-rotation keys. In other embodiments, however, the anti-rotation device 18 may be extended through only one side of the first threaded portion 14 and the tab 22 to form a single shear connection.

In FIG. 1B, only two such anti-rotation devices 18 are illustrated, but it should be noted that in other embodiments any desirable number of anti-rotation devices 18 may be positioned within the connector assembly 12 to prevent further rotation of the threaded portions 14 and 16. The number of anti-rotation devices 18 used to secure the connector assembly 12 may be determined based on the materials used for the first and second threaded portions 14 and 16.

In some instances, the number of anti-rotation devices 18 used may be selected to achieve a desired torque resistance of the connection. For example, a larger number of anti-rotation devices 18 may be used when a higher torque resistance is needed for the connection. Each anti-rotation device 18 may provide an additional torque amount of approximately 10,000 foot pounds of torque to the connection. Thus, if a desired amount of torque resistance for the connection is 90,000 foot pounds, then the first and second threaded portions 14 and 16 may be made up to a torque of approximately 50,000 foot pounds and secured using four anti-rotation devices 18 that provide (in total) an additional 40,000 foot pounds of torque. The torque values are provided as illustrative examples only. Accordingly, the methods and steps disclosed herein may be implemented for different torque amounts without departing from the scope of the present disclosure.

In some embodiments, it may be desirable to include a plurality of holes 30 (i.e., pilot holes) formed through the first threaded portion 14 and used to position a desired number of anti-rotation devices 18 into the connector assembly 12. The number of anti-rotation devices 18 may be less than the total number of holes 30. In FIG. 1A, for example, three holes 30 are shown extending through an outer edge of the first threaded portion 14. These holes 30 may be pilot holes used for guiding the anti-rotation devices 18 into the first threaded portion 14. In the illustrated embodiment, only one anti-rotation device 18 is shown positioned within the middle hole 30 of the three holes 30. The other holes 30 may be redundant holes that are pre-drilled into the first threaded portion 14. The redundant holes 30 may be used to position new anti-rotation devices 18 if previously positioned anti-rotation devices 18 break during installation or are removed from the connector assembly 12. It may be desirable to include at least twice as many holes 30 as the expected number of anti-rotation devices 18 to be positioned around the connector assembly 12. This arrangement may make the disclosed system 10 relatively easy to assemble and reconfigure as desired.

It should be noted that variations on the illustrated system 10 may be used in other embodiments. For example, in other embodiments the pin and the box sections of the connector assembly 12 may be reversed, such that the box acts as the first threaded portion 14 having the groove 20 and the pin acts as the second threaded portion 16 having the tab 22.

Figure 2A:
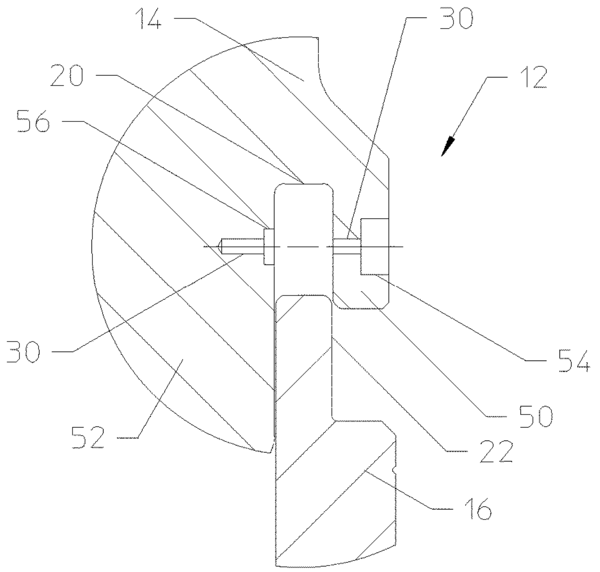
FIGS. 2A-2C are partial cross-sectional views illustrating an anti-rotation device being installed in a connector assembly, in accordance with an embodiment of the present disclosure.
Figure 2B:
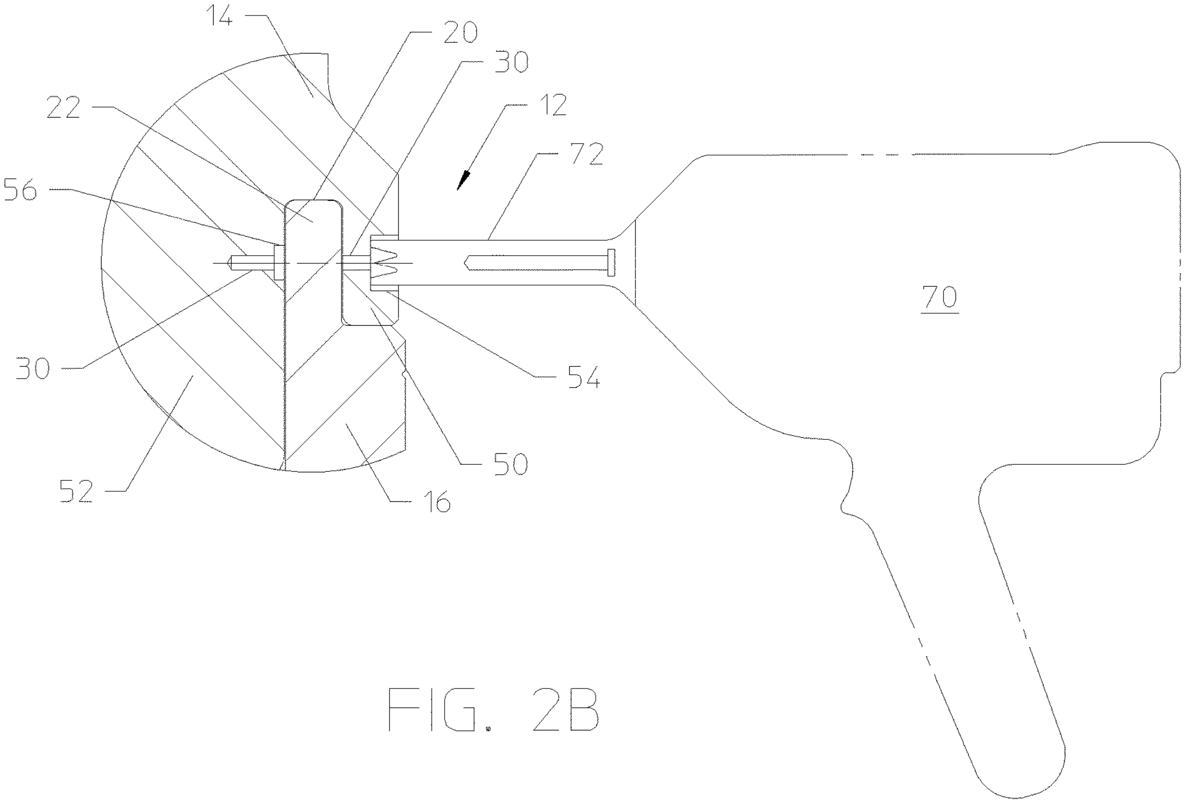
Figure 2C:
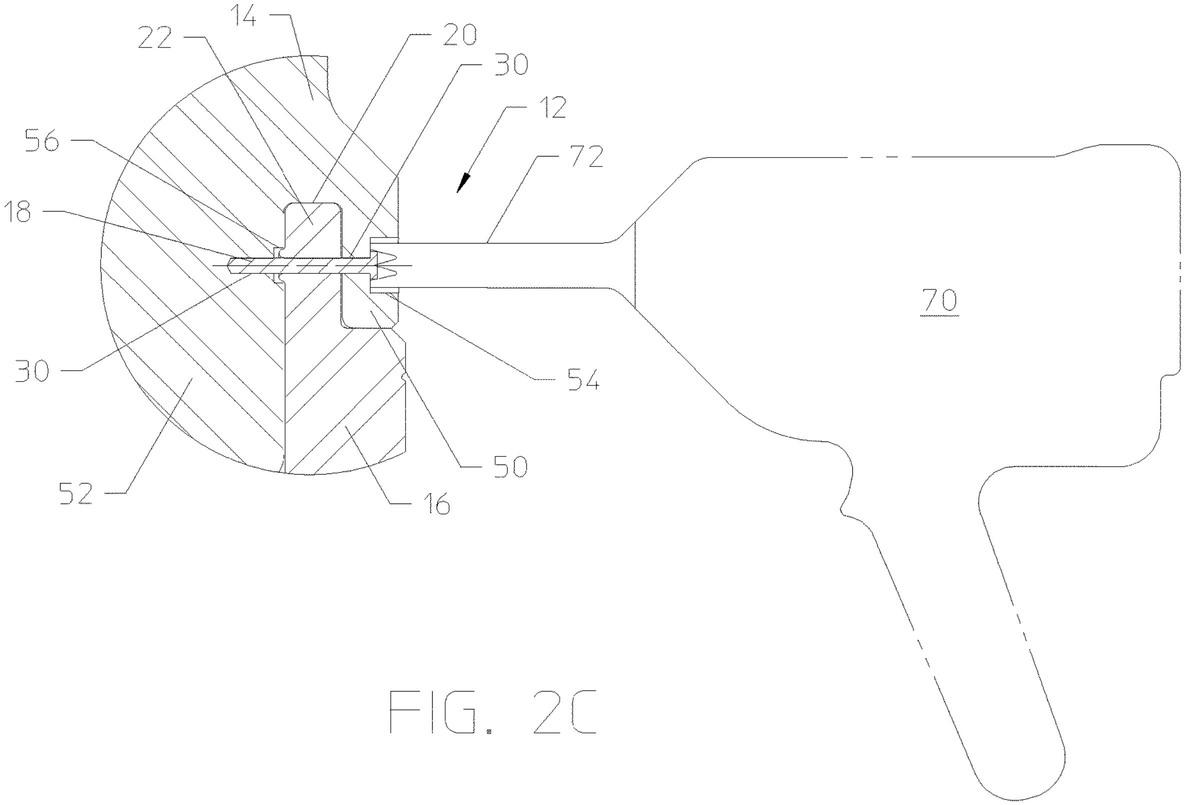

FIGS. 2A-2C illustrate the connector assembly 12 of FIGS. 1A and 1B being secured via the anti-rotation device 18. FIG. 2A provides a detailed view of the interface between the first threaded portion 14 and the second threaded portion 16 of the connector assembly 12. As illustrated, the first threaded portion 14 may include the groove 20 cut vertically into the face designed to mate with the second threaded portion 16. The first threaded portion 14 may include an outer ring 50 on one side of the groove 20 and an internal body 52 on an opposite side of the groove 20. The groove 20 will be deep enough to receive the corresponding tab 22 extending from the second threaded portion 16. The tab 22 may be shaped to interface with the groove 20 and to abut the outer ring 50 when the first threaded portion 14 and the second threaded portion 16 are mated.

The second threaded portion 16 may include the elongated tab 22 designed to be received into the groove 20 of the first threaded portion 14. The groove 20 and tab 22 may be sized based on the strength of the materials used in the first and second threaded portions 14 and 16. The groove 20 and tab 22 may also be sized based on the size of the threaded portions 14 and 16 that make up the connector assembly 12. In some embodiments, the groove 20 and tab 22 may be sized based on the desired make-up torque needed to make the connection. Each size of connector assembly 12 may have different make-up torques and material requirements, so these may be generally considered when selecting the dimensions of the groove 20 and tab 22 used for the connection.

As mentioned above, the first threaded portion 14 may include a pilot hole 30 formed therethrough. The pilot hole 30, as shown, may be drilled through the outer ring 50 and may penetrate the internal body 52 of the first threaded portion 14. This way, the pilot hole 30 may extend through both sides of the groove 20. The pilot hole 30 is designed to receive and guide the anti-rotation device through the first and second threaded portions 14 and 16 to secure the connection at a desired make-up torque.

In addition to the pilot hole 30, the first threaded portion 14 may include a counterbore 54 formed along an outside surface of the outer ring 50. The counterbore 54 may be concentric with the pilot hole 30 and, as discussed below, may be used to seat an installation tool designed to force the anti-rotation device into the connector assembly 12. As described in detail below, some embodiments of the first threaded portion 14 may also include a counterbore 56 formed along an outside facing surface of the internal body 52. This counterbore 56 may also be concentric with the pilot hole 30 and the outside counterbore 54.

The pilot hole 30 may be drilled through only the first threaded portion 14 and not through the tab 22 extending from the second threaded portion 16. This is because any pre-drilled holes formed in the tab 22 would be unlikely to align properly with the pilot holes 30 in the first threaded portion 14 when the connection is made up, due to tolerances on the thread make-up between the threaded portions 14 and 16. In the illustrated embodiment, the pilot hole 30 through both sides of the first threaded portion 14 will be enough to direct the anti-rotation device through the portion of the tab 22 that is matched up with the hole 30 at the desired make-up torque.

FIG. 2B shows an installation tool 70 being brought into contact with the connector assembly 12 to install the anti-rotation device through the first and second threaded portions 14 and 16. The counterbore 54 may be used to align the installation tool 70 so that the anti-rotation device will be driven through the first and second threaded portions 14 and 16 in a proper alignment (e.g., following the pilot hole 30). Specifically, the counterbore 54 may be used to fit a barrel 72 of the installation tool 70 in a proper alignment against the first threaded portion 14. In some embodiments, the first threaded portion 14 may include the counterbore 54 for seating the installation tool 70 in a proper alignment even if there are no pilot holes drilled through the first threaded portion 14.

The installation tool 70 may be any desirable tool that can exert a force to drive the anti-rotation device through the outer ring 50, the tab 22, and a portion of the internal body 52. The installation tool 70 may utilize pneumatic pressure, hydraulic pressure, mechanical force (such as a spring force), or an explosive charge (e.g., similar to a nail gun) to drive the anti-rotation device through the layers of material that make up the connector assembly 12. In other embodiments, the installation tool 70 may be a hammer used to mechanically drive the anti-rotation device 18 through the connector assembly 12.

FIG. 2C illustrates the anti-rotation device 18 extending through the tab 22 and the first threaded portion 14 in response to force from the installation tool 70. As described above, the anti-rotation device 18 may be guided by the pilot hole 30 to extend through the outer ring 50, the tab 22, and into the internal body 52 of the first threaded portion 14. As the anti-rotation device 18 is forced through the tab 22, the anti-rotation device 18 may cause the material of the tab 22 to deform where the anti-rotation device 18 exits the tab 22. As illustrated, the counterbore 56 formed on the outside face of the internal body 52 may be used to receive the material that is deformed and extruded from the tab 22 when the anti-rotation device 18 is installed. This material deformation extending from the tab 22 into the internal body 52 of the first threaded portion 14 may further increase the interference between the first and second threaded portions 14 and 16, thereby increasing the anti-rotation capability.

In some embodiments, the installation method of using a triggered installation tool 70 with a barrel 72 may facilitate rifling of the anti-rotation device 18 as it moves from the installation tool 70 through the connector assembly 12. This may further increase the interference fit between the threaded portions 14 and 16, thereby making the connection more secure.

Figure 3A:
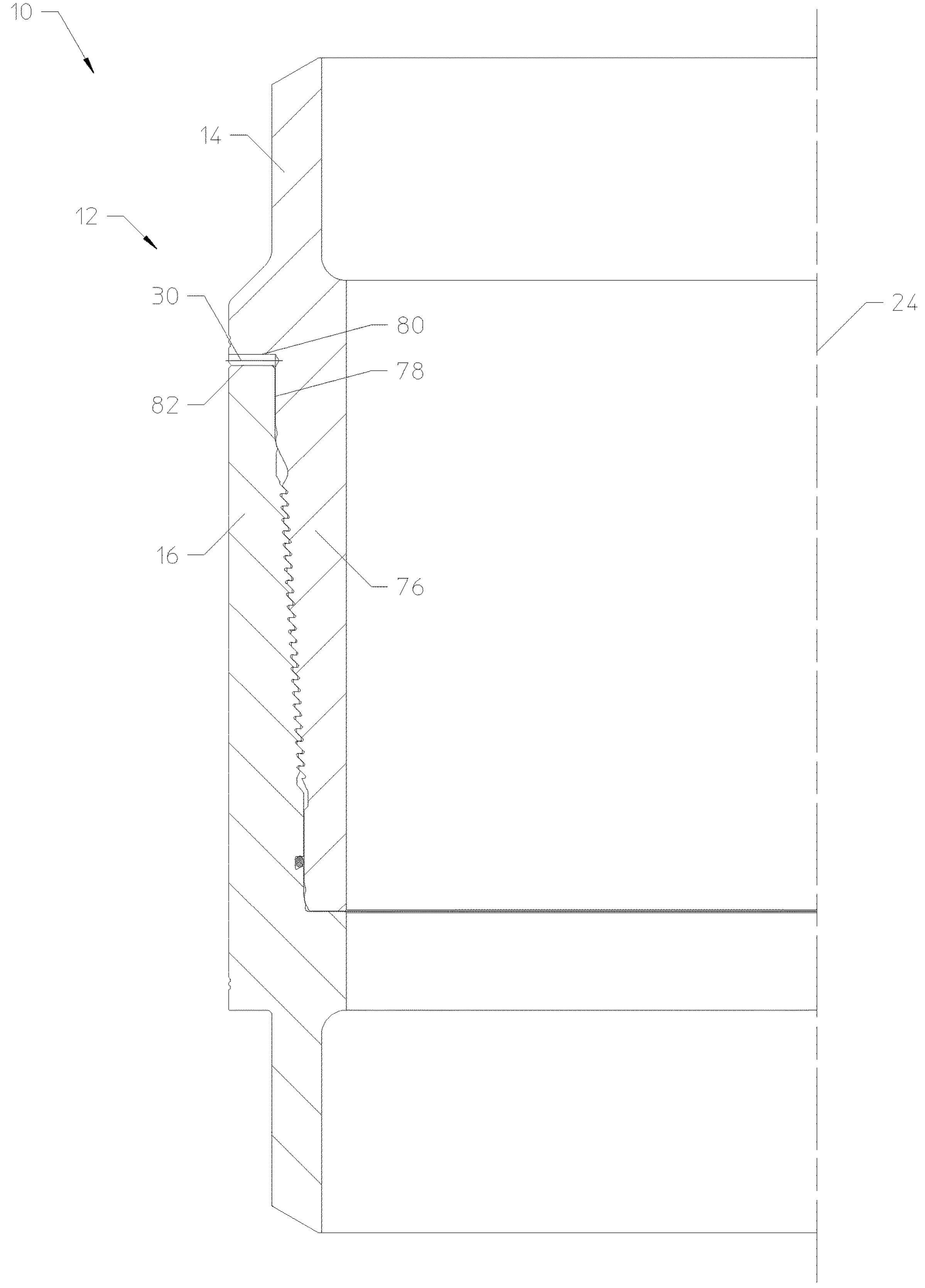
FIGS. 3A and 3B are cutaway views of a connector assembly with an anti-rotation device, in accordance with an embodiment of the present disclosure.
Figure 3B:
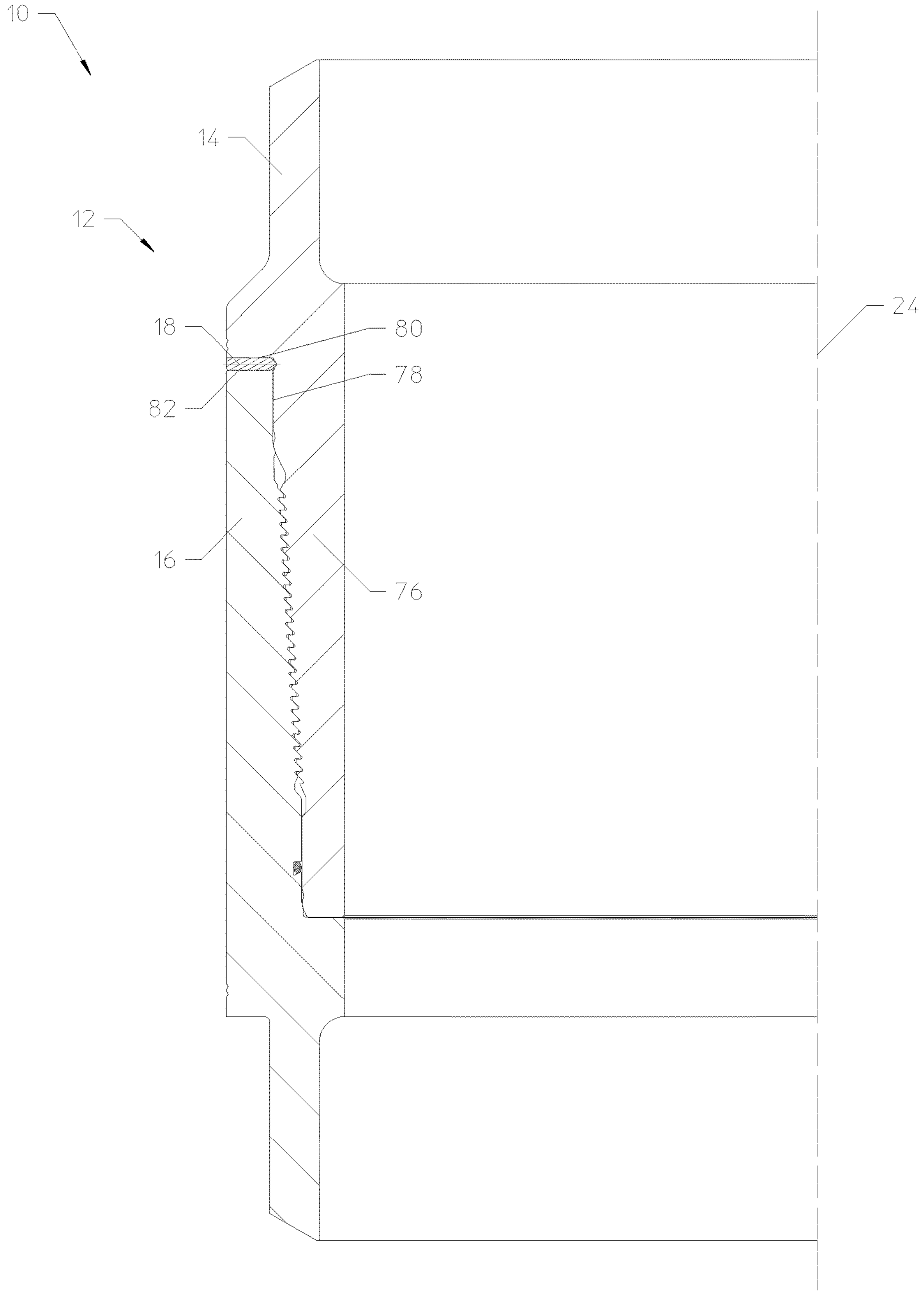
Figure 4A:
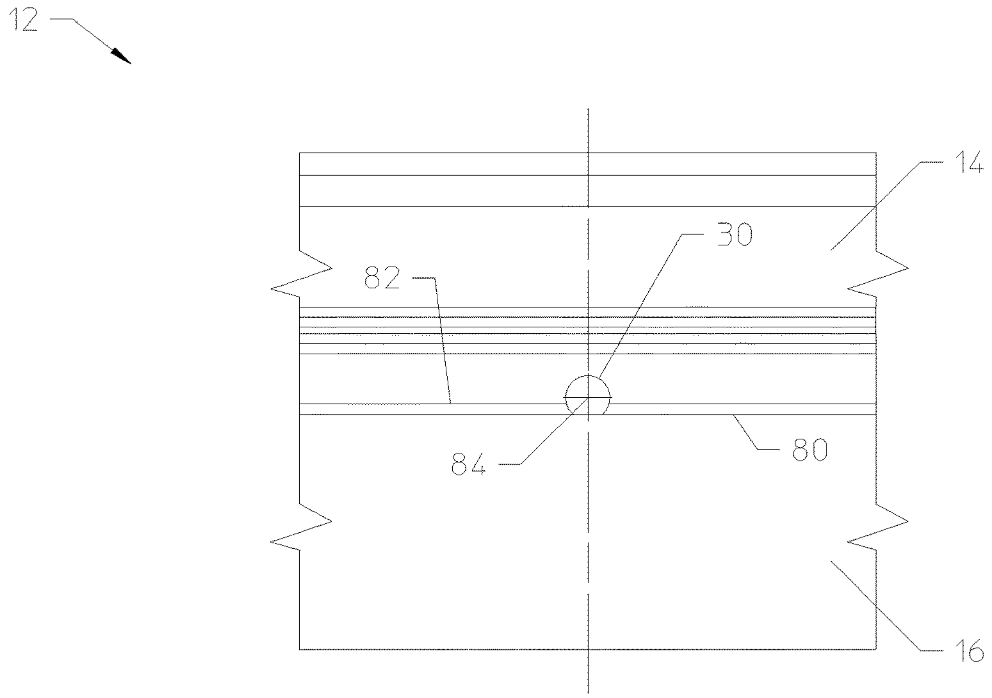
FIGS. 4A and 4B are front views of the connector assembly of FIGS. 3A and 3B, in accordance with an embodiment of the present disclosure.
Figure 4B:
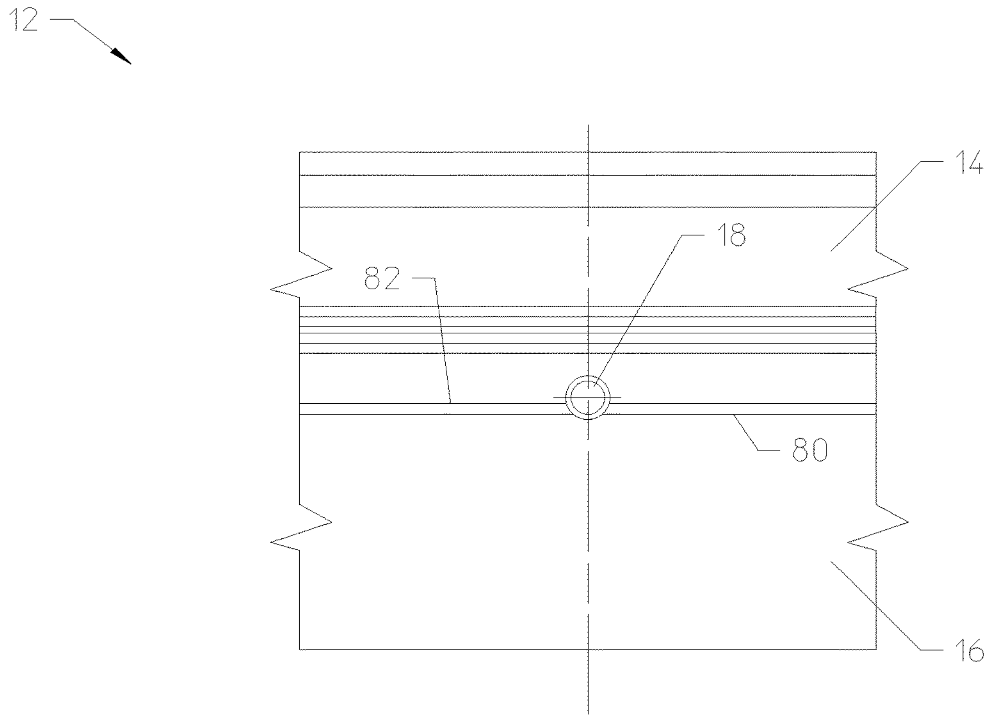

FIGS. 3A-4B illustrate another embodiment of the disclosed anti-rotation system 10. Specifically, FIGS. 3A and 4A show the connector assembly 12 without the anti-rotation device 18 installed, and FIGS. 3B and 4B show the connector assembly 12 with the anti-rotation device 18 installed. In this embodiment, the connector assembly 12 may include a first threaded portion 14 and a second threaded portion 16 that interface with each other through a more traditional pin/box connection 76. As illustrated in FIGS. 3A and 3B, this connection 76 may not include a groove and corresponding tab for interfacing the threaded portions 14 and 16. Instead, the connection 76 between the two threaded portions 14 and 16 may be merely along a single longitudinal edge 78.

In the illustrated embodiment, the first threaded portion 14 may include a pilot hole 30 formed therethrough to direct the anti-rotation device 18 into engagement with the first and second threaded portions 14 and 16. As described above, the anti-rotation device 18 may include any elongated structural mechanism that can be forced through the first and second threaded portions 14 and 16 at their interface. For example, the anti-rotation device 18 may include a hardened nail, a pin (tapered or having a constant thickness), or a spike. The anti-rotation device 18 may be delivered into the connector assembly 12 via the installation tool 70 or similar trigger mechanism as described above with reference to FIGS. 2A-2C.

As illustrated in FIGS. 3A-4B, the pilot hole 30 may be drilled through an interfacing edge 80 of the first threaded portion 14. The interfacing edge 80 may be designed to interface with or be disposed proximate to an opposing interfacing edge 82 of the second threaded portion 16 upon make-up of the connection. The pilot hole 30 may be drilled (and consequently the anti-rotation device 18 may extend) through the first threaded portion 14 in a radially inward direction with respect to the axis 24 of the connector assembly 12. It should be noted that other arrangements and angles of these components relative to each other may be utilized in other embodiments of the disclosed system 10.

The pilot hole 30 may be drilled through the interfacing edge 80 of the first threaded portion 14 such that at least a portion of the interfacing edge 82 of the second threaded portion 16 extends into the pilot hole 30 when the threaded connection is made up (e.g., FIG. 4A. To that end, in some embodiments, pilot hole 30 may be formed through the first threaded portion 14 such that a center point 84 of the pilot hole 30 is a shorter distance away from the interfacing edge 80 than the diameter of the pilot 30. In some embodiments, the pilot hole 30 may be a partially drilled hole for receiving the anti-rotation device 18. That is, the pilot hole 30 may be drilled to a diameter that is less than the diameter of the corresponding anti-rotation device 18 to be installed therethrough. For example, the partially drilled hole may be drilled to a diameter that is within a range of approximately 1% to 99%, 10% to 90%, 40% to 85%, or 70% to 80% of the diameter of the anti-rotation device 18. That way, when the anti-rotation device 18 is installed into the threaded connection via the pilot hole 30, the anti-rotation device 18 may engage and deform a portion of both the first and second threaded portions 14 and 16 along the full length of the anti-rotation device 18. This may provide a solid connection between the anti-rotation device 18 and both threaded portions 14 and 16, thereby preventing rotation of the threaded portions 14 and 16 relative to one another.

Although only one anti-rotation device 18 is illustrated in FIGS. 3B and 4B, it should be noted that in other embodiments any desirable number of anti-rotation devices 18 may be positioned within the connector assembly 12 to prevent further rotation of the threaded portions 14 and 16. The number of anti-rotation devices 18 used to secure the connector assembly 12 may be determined based on the materials used for the first and second threaded portions 14 and 16.

Figure 5:
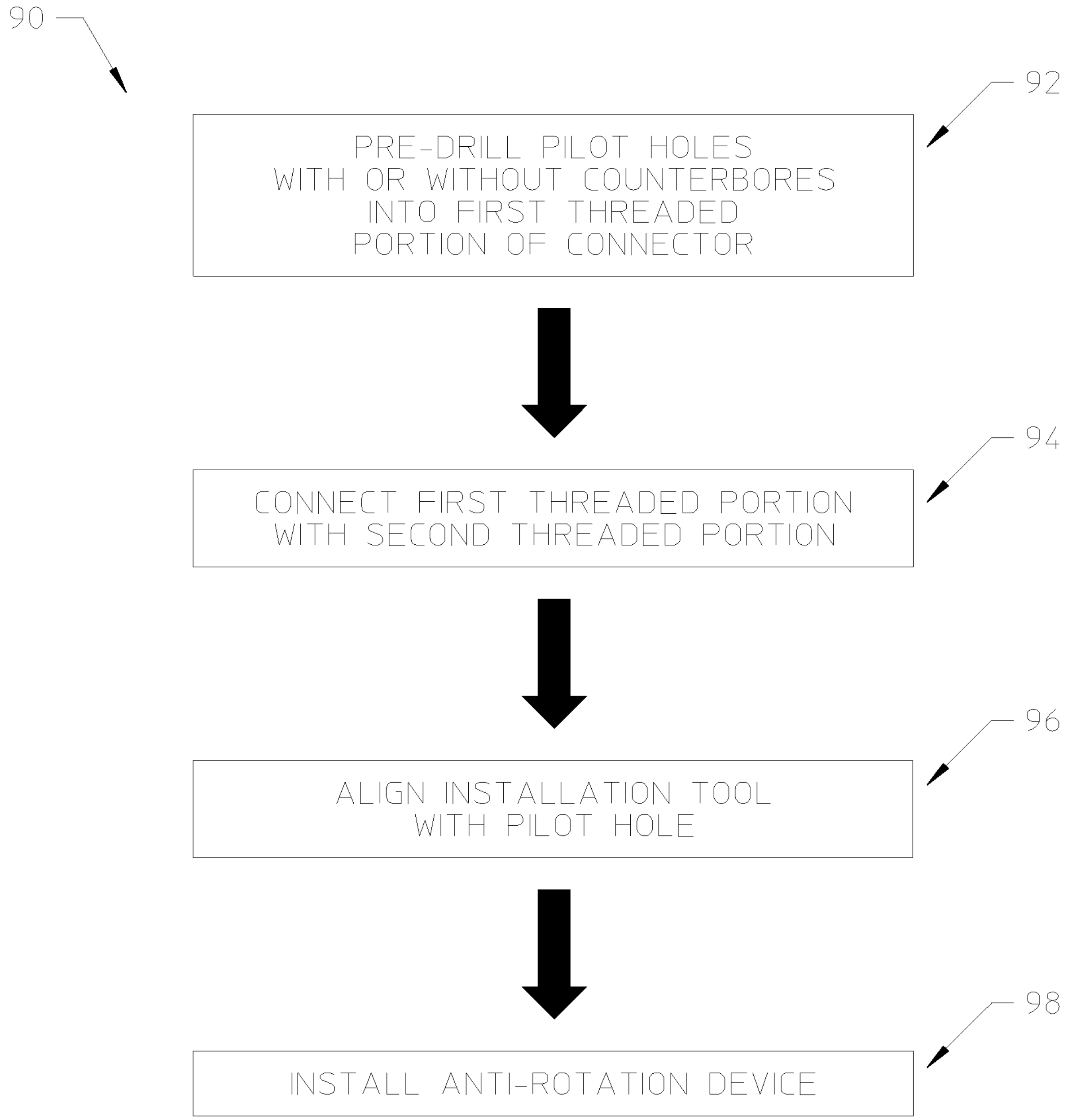
FIG. 5 is a process flow diagram of a method for securely coupling tubular members using a connector assembly with an anti-rotation device, in accordance with an embodiment of the present disclosure.

FIG. 5 illustrates a method 90 for securely coupling two tubular components using the presently disclosed anti-rotation device 18 and connector assembly 12. The method 90 may include pre-drilling (block 92) the pilot hole 30 and any desired counterbores 54 through the first threaded portion 14 of the connector assembly 12. The holes 30 and/or counterbores 54 may be formed at different points around the outer diameter of the first threaded portion 14.

In some embodiments (e.g., FIGS. 1A-2C), the first threaded portion 14 may include a groove 20 formed therein, and the pilot hole 30 may be pre-drilled (block 92) through an outer ring 50 of the first threaded portion 14 on the external side of the groove 20. In some embodiments, additional counterbores 56 may be pre-drilled into the internal body 52 of the first threaded portion 14 on the other side of the groove 20. In still other embodiments (e.g., FIGS. 3A-4B), the pilot hole 30 may be pre-drilled (block 92) through an interfacing edge 80 of the first threaded portion 14.

The method 90 may then include connecting (block 94) the first threaded portion 14 with the second threaded portion 16 of the connector assembly 12 to connect two tubular components at a desired make-up torque. In some embodiments, this may involve connecting the threaded portions 14 and 16 such that a groove 20 formed into the first threaded portion 14 receives a tab 22 extending from the second threaded portion 16. In other embodiments, an interfacing edge 82 of the second threaded portion 16 may extend at least partially into the pre-drilled pilot hole 30 through the first threaded portion 14 when the first and second threaded portions 14 and 16 are connected.

Once the connector assembly 12 is made up, the installation tool 70 may be aligned (block 96) with the pilot hole 30 (e.g., via a corresponding counterbore 54). The method 90 may then include installing (block 98) the anti-rotation device 18 via the installation tool 70. In some embodiments, this installation step may include guiding the anti-rotation device 18 through the first threaded portion 14 and the tab 22 via the pilot hole 30, as shown in FIG. 2C. In other embodiments, this installation step may include guiding the anti-rotation device 18 through the first threaded portion 14 and into engagement with the interfacing edge 82 of the second threaded portion 16 along the length of the anti-rotation device 18, as shown in FIG. 3B.

In some embodiments, the installation tool 70 may be a triggered mechanism that utilizes pneumatic pressure, hydraulic pressure, mechanical force, or an explosive charge to force the anti-rotation device 18 through the connector assembly 12. In such instances, this installation may include rifling the anti-rotation device 18 as it exits the installation tool 70 to create an interference pattern (i.e., friction fit) that makes the anti-rotation device harder to remove from the connector assembly 12. In other embodiments, the installation tool 70 may be a hammer used to drive the anti-rotation device 18 (e.g., a tapered pin) into connection with the first and second threaded portions 14 and 16. Thus, the installation step may include hammering the tapered pin into the connector assembly 12 via the installation tool 70.

At this point in the method 90, the installation process including aligning (block 96) the installation tool 70 and installing (block 98) the anti-rotation device 18 via the installation tool 70 may be repeated at different points along the outer circumference of the connector assembly 12. This may provide a relatively secure and zero-clearance connection between the two tubular components using the disclosed anti-rotation device 18 and connector assembly 12.

Although the present disclosure and its advantages have been described in detail, it should be understood that various changes, substitutions and alterations can be made herein without departing from the spirit and scope of the disclosure as defined by the following claims.

What is claimed is:

1. A method, comprising:

pre-drilling a pilot hole through a first threaded portion of a connector assembly;

engaging the first threaded portion with a second threaded portion of the connector assembly, wherein the first threaded portion comprises:

a groove configured to receive a tab extending from the second threaded portion;

an outer ring on one side of the groove and aligning with a radially external surface of the first threaded portion; and an internal body on an opposite side of the groove, wherein the pilot hole extends through the outer ring and penetrates into the internal body;

wherein engaging the first threaded portion with the second threaded portion comprises receiving the tab extending from the second threaded portion into the groove formed in the first threaded portion, wherein the tab does not comprise the pre-drilled pilot hole; and installing an anti-rotation device through the first and second threaded portions of the connector assembly via an installation tool, wherein the pilot hole directs the anti-rotation device during installation, wherein installing the anti-rotation device comprises introducing the anti-rotation device through the outer ring from the radially external surface of the first threaded portion and driving the anti-rotation device through the tab and into the internal body of the first threaded portion of the connector assembly, wherein the tab does not comprise any opening operable to receive the anti-rotation device, wherein rotation between the first threaded portion and the second threaded portion is prevented via the anti-rotation device.

2. The method of claim 1, further comprising aligning the installation tool with the pilot hole by seating the installation tool in a counterbore formed on an outside surface of the first threaded portion.

3. The method of claim 1, wherein installing the anti-rotation device comprises using pneumatic pressure, hydraulic pressure, mechanical force, or an explosive charge to force the anti-rotation device through the connector assembly.

4. The method of claim 1, further comprising rifling the anti-rotation device via the installation tool to form an interference pattern between the anti-rotation device and the connector assembly.

5. The method of claim 1, wherein the installation tool comprises a hammer and the anti-rotation device comprises a tapered pin, wherein installing the anti-rotation device comprises hammering the tapered pin through the first and second threaded portions.

6. The method of claim 1, further comprising installing a plurality of anti-rotation devices through the first and second threaded portions in a circumferential arrangement about the connector assembly.

7. The method of claim 1, further comprising pre-drilling the pilot hole through an interfacing edge of the first threaded portion proximate the second threaded portion, wherein engaging the first threaded portion with the second threaded portion comprises receiving a corresponding interfacing edge of the second threaded portion at least partially into the pilot hole formed in the first threaded portion.

8. The method of claim 7, further comprising pre-drilling the pilot hole in the first threaded portion with a diameter that is less than a total diameter of the anti-rotation device.

9. The method of claim 1, further comprising receiving, into a counterbore formed in the internal body of the first threaded portion, at least a portion of material of the tab that is deformed and extruded from the tab when the anti-rotation device is installed.

* * * * *